US006720123B2

(12) United States Patent
Xu et al.

(10) Patent No.: US 6,720,123 B2
(45) Date of Patent: Apr. 13, 2004

(54) PROCESS FOR PRODUCING TONER FOR DEVELOPING ELECTROSTATIC IMAGE

(75) Inventors: Yuqing Xu, Kanagawa (JP); Kazuo Mitsuhashi, Kanagawa (JP); Tomohiko Tokunaga, Kanagawa (JP); Toyomasa Hoshino, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/066,614

(22) Filed: Feb. 6, 2002

(65) Prior Publication Data

US 2003/0003387 A1 Jan. 2, 2003

(30) Foreign Application Priority Data

Feb. 9, 2001 (JP) ....................................... 2001-033053
Sep. 27, 2001 (JP) ....................................... 2001-297455

(51) Int. Cl.[7] ................................................ C08J 3/215
(52) U.S. Cl. .................................. 430/137.14; 523/335
(58) Field of Search ......................... 430/137.14, 111.4; 523/335

(56) References Cited

U.S. PATENT DOCUMENTS

| | | | | | |
|---|---|---|---|---|---|
| 4,659,641 | A | * | 4/1987 | Mahalek et al. | 430/137.17 |
| 4,997,739 | A | * | 3/1991 | Tomono et al. | 430/108.8 |
| 5,576,393 | A | * | 11/1996 | Yamashita et al. | 430/137.14 |
| 5,723,252 | A | * | 3/1998 | Patel et al. | 430/137.14 |
| 5,849,456 | A | | 12/1998 | Matsumura et al. | |
| 5,965,316 | A | * | 10/1999 | Kmiecik-Lawrynowicz et al. | 430/137.14 |
| 5,968,701 | A | * | 10/1999 | Onuma et al. | 430/111.4 |
| 6,096,465 | A | | 8/2000 | Kadokura et al. | |
| 2001/0033983 | A1 | * | 10/2001 | Ohno et al. | 430/108.8 |

FOREIGN PATENT DOCUMENTS

| | | |
|---|---|---|
| EP | 0 542 051 | 5/1993 |
| EP | 1 109 069 | 6/2001 |
| EP | 1 146 397 | 10/2001 |
| JP | 2000-131882 | 5/2000 |

OTHER PUBLICATIONS

U.S. patent application Ser. No. 09/338,578, filed Jun. 23, 1999, pending.

U.S. patent application Ser. No. 09/756,124, filed Jan. 9, 2001, pending.

U.S. patent application Ser. No. 09/736, 50, filed Dec. 15, 2000, pending.

U.S. patent application Ser. No. 09/737,579, filed Dec. 18, 2000, pending.

U.S. patent application Ser. No. 09/790,637, filed Feb. 23, 2001, pending.

* cited by examiner

*Primary Examiner*—Christopher Rodee
(74) *Attorney, Agent, or Firm*—Oblon, Spivak, McClelland, Maier & Neustadt, P.C

(57) ABSTRACT

A process for producing a toner for developing electrostatic image is described, which involves an agglomerate step wherein a dispersion liquid containing at least primary polymer particles and colorant particles is stirred in a stirring tank to agglomerate the particles to thereby obtain agglomerate of the particles and an aging step wherein the resultant agglomerate of the particles is kept at a temperature higher than the glass transition temperature (Tg) of the primary polymer particles by 10° C. or more for a predetermined period of time to thereby fuse the particles, which process is characterized in that the concentration of solid content (C1) in the agglomerate step is 10 to 40% by weight, and that the concentration of the solid content (C2) in the aging step is in the range of $0.3C1 \leqq C2 \leqq 0.8C1$.

21 Claims, No Drawings

PROCESS FOR PRODUCING TONER FOR DEVELOPING ELECTROSTATIC IMAGE

FIELD OF THE INVENTION

The present invention relates to a process for producing a toner for developing electrostatic image to be used for copying machines and printers of electrophotographic system. More particularly, it relates to a process for producing a toner for developing electrostatic image which facilitates controlling of the shape of toner particles in the step of aging agglomerate particles of primary polymer particles.

BACKGROUND OF THE INVENTION

Toners for developing electrostatic image having conventionally been commonly used in the electrophotography have been produced by melt-kneading a mixture comprising a varying binder such as styrene/acrylate series copolymer or a polyester containing therein a colorant such as carbon black or a pigment and, if necessary, a charge control agent and a magnetic material using an extruder, and pulverizing and classifying the kneaded product. However, the conventional toners obtained by the melt-kneading/pulverizing method have the limit as to controlling of toner particle size, and it is difficult to produce a toner of substantially 10 μm or less, particularly 8 μm or less, in average particle size with a good yield and thus the conventional toners cannot be said to be sufficient for providing a high resolution which will be required in the electrophotography in the future.

In addition, in order to obtain low temperature fixing properties, it has been proposed to blend a wax having a low melting point with a toner upon kneading but, in the kneading/pulverizing method, the maximum blending content of the wax is about 5% which fails to provide a toner having enough low temperature fixing properties. Also, in the case of producing toner by mechanically pulverizing the flakes obtained from the melt-kneaded product, there results a toner with a broad particle size distribution and only in a poor yield. This tendency is serious particularly in the case of obtaining a toner with a small particle size.

On the other hand, in recent years, it has been known, as a process substituting for the melt-kneading/pulverizing method, to produce a polymerization toner by the emulsion polymerization agglomeration process or the suspension polymerization process. These processes permit to control dispersion of the raw materials as is different from the melt-kneading/pulverizing process. In particular, the emulsion polymerization agglomeration process permits to control particle size, particle size distribution and shape of the toner particles.

In the case of producing a toner by the emulsion polymerization process, a pigment, a charge control agent, etc. are added to the resin-emulsified dispersion obtained by the polymerization and containing primary particles of the resin of 0.05 μm to 0.5 μm in particle size and, further, an electrolyte or the like is added thereto to agglomerate the primary particles to form agglomerate particles of 3 to 9 μm in particle size. Then, the agglomerate particles are aged at an elevated temperature of the glass transition temperature (Tg) of the primary particles or higher than that to first fuse particles at the surface and then particles in the inside of each agglomerate particle to each other, followed by washing and drying the slurry containing the toner particles to obtain toner particles as a product. Shape of the toner particles exerting an important influence on the properties of the toner is controlled in the aging step at an elevated temperature.

Japanese Patent Laid-Open No. 2000-131882 proposes to change the concentration of at least either of an agglomerating agent and a stabilizing agent upon thermobonding which corresponds to the aging step. To be specific, the concentration is decreased by about 6% through the addition of distilled water upon thermobonding. Also, it is described in U.S. Pat. No. 5,849,456 to add a surfactant in the step of fusing the particles.

However, in these processes, the scope of resins to which these processes can be applied is small and, with agglomerate particles having a higher glass transition temperature (Tg), the primary particles are so difficult to deform that it is difficult to fuse the particles to each other. Therefore, toner particles obtained by the process are difficult to control their shape and, in addition, they have a weak strength and tends to form fine powder, which exerts detrimental influences upon image quality.

SUMMARY OF THE INVENTION

The subject of the present invention is to provide a process for producing a toner for developing electrostatic image, which facilitates to control shape of toner particles in the step of aging agglomerate particles of primary polymer particles.

As a result of intensive investigations to solve the above-described problem, the inventors have found that agglomerate particles can easily be deformed and controlling of the shape of toner particles can easily be effected by largely reducing the concentration of solid content in the toner-aging step in comparison with the concentration in the agglomerate step through addition of water or the like, thus having achieved the invention.

That is, a gist of the invention lies in the process for producing a toner for developing electrostatic image involving the agglomerate stop wherein a dispersion liquid containing at least primary polymer particles and colorant particles is stirred in a stirring tank to agglomerate the particles to thereby obtain agglomerate of the particles and the aging step wherein the resultant agglomerate of the particles is kept at a temperature higher than the glass transition temperature (Tg) of the primary polymer particles by 10° C. or more for a predetermined period of time to thereby fuse the particles, which process is characterized in that the concentration of solid content (C1) in the agglomerate step is 10 to 40% by weight, and that the concentration of the solid content (C2) in the aging step is in the range of $0.3C1 \leqq C2 \leqq 0.8C1$.

Another gist of the invention lies in the process of the above-described toner for developing electrostatic image, wherein water is mixed upon or after the completion of the agglomerate step.

A further gist of the invention lies in the process for producing the above-described toner for developing electrostatic image, wherein the agglomerate step and the aging step are conducted in the same stirring tank.

DETAILED DESCRIPTION OF THE INVENTION

The present invention is described in detail below.

The toner of the invention contains as its constituents primary polymer particles, colorant particles and, if necessary, wax, a charge control agent and other additives. The toner of the invention is commonly produced by the emulsion polymerization-agglomeration process. In the emulsion polymerization-agglomeration process, the primary polymer particles obtained by the emulsion polymerization, at least primary colorant particles, and primary particles of charge control agent optionally added are co-agglomerated to form an agglomerate of the particles, followed by adhering or fixing thereto particulate resin to produce a toner.

Next, the primary polymer particles to be used in the invention are described below.

The primary polymer particles may contain a wax. In the case where the primary polymer particles contain the wax, the particles are obtained preferably by the process of seed emulsion polymerization of a monomer mixture using the particulate wax as seed, though not being particularly limited.

In conducting the emulsion polymerization, the polymerization is allowed to proceed by adding successively a monomer having a Brønsted acid group (hereinafter sometimes referred to merely as "acid group") or a monomer having a Brønsted base group (hereinafter sometimes referred to merely as "base group") and a monomer having neither of the Brønsted acid group and the Brønsted base group (hereinafter sometimes referred to as "other monomer"). In this case, the monomers may be separately added, or a plurality of the monomers may previously be mixed with each other to add. Further, it is also possible to change the monomer composition during addition of the monomers. The monomers may be added as such, or may be added as an emulsion liquid previously prepared by mixing with water or an emulsifier. As the emulsifier, one, two or more of the surfactants to be described hereinafter may be selected.

In conducting the emulsion polymerization, it is also possible to add a definite amount of an emulsifier (a surfactant to be described hereinafter) to an emulsion containing particulate wax. Addition of the polymerization initiator may be conducted before, simultaneously with, or after the addition of the monomers, or may be conducted in a combined manner thereof.

As the monomer having the Brønsted acid group to be usefd in the invention, there are illustrated monomers having a carboxyl group, such as acrylic acid, methacrylic acid, maleic acid, fumaric acid and cinnamic acid; monomers having a sulfonic acid group, such as sulfonated styrene; and monomers having a sulfonamide group, such as vinylbenzenesulfonamide.

As the monomer having the Brønsted base group, there are illustrated aromatic vinyl compounds having an amino group, such as aminostyrene; monomers containing a nitrogen-containing betero ring, such as vinylpyridine and vinylpyrrolidone; and (meth)acrylic acid esters having an amino group, such as dimethylaminoethyl acrylate and diethylaminoethyl methacrylate.

These monomers having the acidic group and the monomers having the basic group may exist as salts with counter ions.

The amount of such monomer having the Brønsted acid group or the Brønsted base group to be compounded in the monomer mixture constituting the primary polymer particles is preferably 0.5% by weight or more, more preferably 1% by weight or more, and is preferably 10% by weight or less, more preferably 5% by weight or less.

As other comonomers, there are illustrated styrenes such as styrene, methylstyrene, chlorostyrene, dichlorostyrene, p-tert-butylstyrene, p-n-butylstyrene and p-n-nonylstyrene; (meth)acrylic acid esters such as methyl acrylate, ethyl acrylate, propyl acrylate, n-butyl acrylate, isobutyl acrylate, hydroxyethyl acrylate, ethylhexyl acrylate, methyl methacrylate, ethyl methacrylate, propyl methacrylate, n-butyl methacrylate, isobutyl methacrylate, hydroxyethyl methacrylate and ethylhexyl methacrylate; and acrylic acid amides such as acrylamide, N-propylacrylamide, N,N-dimethylacrylamide, N,N-dipropylacrylamide, and N,N-dibutylacrylamide. Of these, styrene, butyl acrylate, etc. are particularly preferred.

The resin to be used for the primary polymer particles, those which are crosslinked are preferred. Crosslinking is completed by compounding a monomer having at least two functional groups (multi-functional monomer).

In the case of using a crosslinked resin for the primary polymer particles, a radical polymerizable, multi-functional monomer is used as the crosslinking agent to be used together with the above-described monomers, and there are illustrated, for example, divinylbenzene, hexanediol diacrylate, ethylene glycol dimethacrylate, diethylene glycol dimethacrylate, diethylene glycol diacrylate, triethylene glycol diacrylate, neopentyl glycol diacrylate, neopentyl glycol acrylate, diallyl phthalate, etc. In addition, it is also possible to use a monomer having a reactive group in a pendant group, such as glycidyl methacrylate, methylolacrylamide or acrolein.

The compounding ratio of such multi-functional monomer in the monomer mixture is preferably 0.005% by weight or more, more preferably 0.01% by weight or more, particularly preferably 0.05% by weight or more, and is preferably 5% by weight or less, more preferably 3% by weight or less, particularly preferably 1% by weight or less.

These monomers are used alone or as a mixture thereof, and it is preferred for the resultant polymer to have a glass transition temperature of 40 to 80° C. In case where the glass transition temperature exceeds 80° C., there might arise in some cases the problem that the fixing temperature becomes too high or that OHP transparency is deteriorated and, in case where the glass transition temperature is less than 40° C., the resultant toner might have in some cases a deteriorated storage stability.

In the invention, as the polymerization initiator for conducting the emulsion polymerization, known water-soluble polymerization initiators may be used. To be specific, there may be used persulfates such as potassium persulfate, sodium persulfate, ammonium persulfate, etc., a redox initiator wherein the persulfate is combined as one component with a reducing agent such as sodium hydrogensulfite or the like, water-soluble polymerization initiators such as hydrogen peroxide, 4,4'-azobiscyanovaleric acid, t-butylhydroperoxide, cumene hydroperoxide, etc., a redox intitiator wherein the water-soluble initiator is combined as one component with a reducing agent such as a ferrous salt or the like, benzoyl peroxide, 2,2'-azobis-isobutyronitrole, etc. Addition of the polymerization initiator may be conducted before, simultaneously with, or after the addition of the monomers, or may be conducted in a combined manner thereof.

In the invention, known chain transfer agents may be used as demanded and, as specific examples of the chain transfer agents, there are illustrated t-dodecylmercaptan, 2-mercaptoethanol, diisopropylxanthogen, tetrachlorocarbon, trichlorobromomethane, etc. The chain transfer agents may be used alone or in combination of two or more of them, and are used usually in an amount of 0 to 5 parts by weight per 100 parts by weight of the monomers.

The wax-containing primary polymer particles obtained by the seed emulsion polymerization are polymer particles substantially containing wax and, with respect to their morphology, they may be in the form of any of a core-shell type, a phase separation type, an occlusion type, tc. or may be in the mixed type thereof. Particularly preferred is the core-shell type.

Volume average particle size of the primary polymer particles is usually in the range of from 0.02 μm to 3 μm, preferably from 0.05 μm to 3 μm, more preferably from 0.1 μm to 2 μm, particularly preferably 0.1 μm to 1 μm. Additionally, the average particle size can be measured by using, for example, "Microtrack UPA (ultra particle analyzer)" manufactured by Nikkiso K.K. In case where the particle size is smaller than 0.02 μm, it becomes difficult to control agglomeration rate, thus not being preferred. And, in case where the particle size is larger than 3 μm, there result agglomerated toner particles having a too large particle size, thus not being suitable for the use requiring a high resolution as the toner.

In the case of increasing the content of the wax in the toner prepared by using wax of a small particle size as the particulate wax for producing primary polymer particles, it is possible to co-agglomerate other particulate wax upon agglomeration of the primary polymer particles. However, in consideration of dispersibility of the particulate wax in the toner, it is preferred to encapsulate substantially all of the wax in the primary polymer particles.

In the invention, it is possible to use colorant particles as seeds for the emulsion polymerization together with the particulate wax, or to use the colorant dissolved or dispersed in the monomer or the wax upon obtaining the primary polymer particles. However, it is preferred to form an agglomerate of the particles by agglomerating colorant particles simultaneously with the primary polymer particles to thereby form a core material of the toner. In this occasion, primary polymer particles containing the wax are used and, if necessary, two or more kinds of the primary polymer particles may be used. As the colorant to be used here, any of inorganic pigments or organic pigments, and organic dyes may be used alone or in combination of two or more of them.

The content of tetrahydrofuran insolubles of the primary polymer particles is usually 15 to 80% by weight.

In the case of using a crosslinked resin for the primary polymer particles, the content of the tetrahydrofuran insolubles of the primary polymer particles is preferably 15% by weight or more, more preferably 20% by weight or more, particularly preferably 25% by weight or more. The content is preferably 70% or less. As long as the content of the tetrahydrofuran insolubles is within the range described above, there tend to result an excellent offset resistance and an excellent OHP transparency.

Of the components constituting the primary polymer particles, the tetrahydrofuran insolubles have a molecular weight peak (Mp) of preferably 30,000 or more, more preferably 40,000 or more. The tetrahydrofuran insolubles have a molecular weight peak of preferably 150,000 or less, more preferably 100,000 or less. In particular, in the case of using a crosslinked resin, the molecular weight peak is preferably 100,000 or less, more preferably 60,000 or less.

In case where the molecular weight peak is largely smaller than the above-described range, there results a deteriorated offset properties on the higher temperature side whereas, in case where the molecular weight peak is largely greater than the above-described range, there tends to result a deteriorated offset properties on the lower temperature side.

Also, of the components constituting the primary polymer particles, tetrahydrofuran solubles have a weight average molecular weight (Mw) of preferably 30,000 or more, more preferably 80,000 or more, and preferably 500,000 or less, more preferably 300,000 or less.

In the invention, the primary polymer particles obtained by the above-described emulsion polymerization contain residual monomers in an amount of preferably from 1000 to 3000 ppm based on the polymer components therein. The amount of the residual monomers is preferably 1500 to 3000 ppm, more preferably 2000 to 3000 ppm. In case where the amount of the residual monomers is less than 1000 ppm, there tends to result a smaller effect of improving circular degree of the toner particles whereas, in case where the amount exceeds 3000 ppm, there results a tendency that it becomes difficult to reduce the amount of residual monomer in the subsequent steps.

By adjusting the amount of the residual monomer in the primary polymer particles within the above-described range, an effluvium generating from the finally obtained toner can be reduced, and filming of the toner to a photoreceptor due to the residual monomers can be depressed.

Furthermore, when a toner efficient in fixing properties in particular even at high temperature region, and a toner having a storage modulus G' and a loss modulus G" at 200° C. of 400 Pa or more in particular with respect to dynamic viscoelasticity were produced, some inventors of the present invention tried to reduce the amount of the residual monomers as monomers unreacted in the polymerization step. As a result of the attempt, it was proved that when the amount of the residual monomers was excessively reduced, the circular degree of the resultant toner particles was not increased and it was difficult to obtain truly spherical toner particles. When the toner efficient in fixing properties even at a high temperature region as described above was produced, the circular degree of the resultant toner particles could be improved by intensively maintaining the residual monomers within the above described range at the polymerization step, and the amount of the monomers in the resultant toner particles could be decreased by reducing the amount of the resultant monomers at the steps after adjusting the circular degree of the toner particles.

Adjustment of the content of the residual monomers in the primary polymer particles can be conducted by, for example, lowering the temperature upon polymerization or by shortening the polymerization time after the addition of the polymerization initiator in the step of emulsion polymerization.

As the wax to be used in the invention, any of known waxes can be used. Specifically, there are illustrated olefinic waxes such as low molecular weight polyethylene, low molecular weight polypropylene, copolymerized polyethylene, etc.; paraffin wax; ester series waxes having a long aliphatic group, such as behenyl behenate, montanic acid ester, stearyl stearate, etc.; plant series waxes such as hydrogenated castor oil carnauba wax; ketones having a long chain alkyl group, such as distearyl ketone; silicone having alkyl groups; higher fatty acids such as stearic acid; long chain aliphatic alcohols such as eicosanol; carboxylic acid esters or partial esters of polyhydric alcohols obtained from a polyhydric alcohol such as glycerin or pentaerythritol and a long chain fatty acid; higher fatty acid amides such as oleic amide, stearic amide, etc.; low molecular weight polyesters; and the like.

Of these waxes, for improving a fixing property, those which have a melting point of 30° C. or higher are preferred, and those with a melting point of 40° C. or higher are more preferred, with 50° C. or higher being particularly preferred.

Also, those waxes which have a melting point of 100° C. or lower are preferred, and those with a melting point of 90° C. or lower are more preferred, with 80° C. or lower being particularly preferred. In case where the melting point is too low, the wax is liable to come out on the surface after fixing to cause sticking, whereas too high, there results a deteriorated fixing property at lower temperatures.

Further, as the wax compounds, ester series waxes obtained from an aliphatic carboxylic acid and a monohydric or polyhydric alcohol are preferred and, of the ester series waxes, those which have 20 to 100 carbon atoms are preferred, with those containing 30 to 60 carbon atoms being particularly preferred.

Of the esters between the monohydric alcohol and the aliphatic carboxylic acid, behenyl behenate and stearyl stearate are particularly preferred compounds. And, of the esters between the polyhydric alcohol and the aliphatic carboxylic acid, stearic acid ester of pentaerythritol and its partial ester, and montanic acid ester of glycerin and its partial ester are particularly preferred.

The above-described waxes may be used alone or as a mixture thereof. Melting point of the wax compound can properly be selected depending upon the fixing temperature for fixing toner.

In order to enhance the fixing properties, it is effective to use two or more, preferably three or more waxes as a mixture. Particularly, it is preferred to use three or more wax compounds, with none of them exceeding 60% by weight in content based on the weight of the whole waxes. It is still more preferred that none of the wax compounds exceeds 45% by weight in content, more preferably 40% by weight.

It is preferred that, of the wax compounds to be used, at least one wax compound is the carboxylic acid ester of monohydric or polyhydric alcohol described above. It is more preferred that the wax compound compounded in the largest amount is the alkanoic acid ester of monohydric or polyhydric alcohol, with an alkyl ester of the alkanoic acid being particularly preferred. In the case where the wax compound compounded in the largest amount is the alkyl ester of alkanoic acid, the wax compound compounded in the second largest amount is preferably another alkyl eater of alkanoic acid or an alkanoic acid ester of the polyhydric alcohol.

Number of the kinds of waxes to be used in combination is preferably 4 or more, more preferably 5 or more. Although there is no limit as to the number of the kinds of waxes to be used in combination, 50 or less is preferred for the production thereof.

In addition, of the at least 3 kinds of the wax compounds, sum of the two wax compounds compounded in larger amounts than the other waxes is preferably 88% by weight or less, more preferably 85% by weight or less, particularly preferably 80% by weight or less, based on the amount of the whole waxes.

The wax compound to be compounded in the largest amount is a wax compound which has a melting point of preferably 40° C. or higher, more preferably 50° C. or higher, and has a melting point of preferably 90° C. or lower, more preferably 80° C. or lower. In addition, two wax compounds to be compounded in larger amounts than the other wax compounds are particularly preferably those which have a melting point of 40° C. to 90° C.

As will be described hereinafter, the toner of the invention has a structure wherein the particulate wax is comparatively uniformly distributed in the toner, and hence it is inferred that the wax component having a comparatively broader temperature range of from initiation of melting to completion of melting, i.e., the wax component being a mixture with less purity, shows better discharge of the wax from the toner upon fixing even when the fixing temperature changes, thus showing better fixing properties.

The particulate wax to be used in the invention is obtained by emulsifying the above-described wax in the presence of at least one emulsifier selected from among known cationic surfactants, anionic surfactants and nonionic surfactants. These surfactants may be used in combination of two or more of them.

Also, in the invention, emulsification is conducted preferably at a temperature of the melting point of the wax or higher. When emulsified at a temperature of the melting point of the wax or higher, the wax is molten to form droplets in water, thus a dispersion of particulate wax having a nearly spherical shape being obtained.

As specific examples of the cationic surfactants, there are illustrated dodecylammonium chloride, dodecylammonium bromide, dodecyltrimethylammonium bromide, dodecylpyridinium chloride, dodecylpyridinium bromide, hexadecyltrimethylammonium bromide, etc.

As specific examples of the anionic surfactant, there are illustrated fatty acid soaps such as sodium stearate and sodium dodecanoate; sodium dodecylsulfate; sodium dodecylbenzonesulfonate; sodium laurylsulfate, etc.

Further, as specific examples of the nonionic surfactants, there are illustrated polyoxyethylene dodecyl ether, polyoxyethylene hexadecyl ether, polyoxyethylene nonylphenyl ether, polyoxyethylene lauryl ether, polyoxyethylene sorbitan monooleate ether, monodecanoyl sugar, etc.

Of these surfactants, the alkali metal salts of straight chain alkylbenzenesulfonic acid are preferred.

The average particle size of the particulate wax is preferably 0.01 μm to 3 μm, more preferably 0.1 to 2 μm, particularly preferably 0.3 to 1.5 μm. Additionally, the average particle size can be measured by using, for example, LA-500 made by Horiba K.K. In case where the average particle size of the wax emulsion is larger than 3 μm, the average particle size of polymer particles obtained by seed polymerization becomes too large, thus not being suited for the use of producing a small-sized toner required for attaining a high resolution. In case where the emulsion has an average particle size of less than 0.01 μm, it becomes difficult to prepare the dispersion liquid.

The colorant to be used in the invention will be described below.

As specific examples of the colorant, there may be used any of known dyes or pigments such as carbon black, Aniline Blue, Phthalocyanine Blue, Phthalocyanine Green, Hansa Yellow, Rhodamine series dyes and pigments, Chrome Yellow, quinacridon, Benzidine Yellow, Rose Bengal, triarylmethane series dyes, and monoazo, disazo and condensed azo series dyes and pigments alone or as a mixture thereof. With a full-color toner, it is preferred to use Benzidine Yellow or a monoazo or condensed azo series dye or pigment as a yellow colorant, quinacridon or a monoazo series dye or pigment as a magenta colorant, and Phthalocyanine Blue as a cyan colorant. The colorants are usually used in an amount of 3 to 20 parts by weight per 100 parts by weight of a binder resin. Additionally, in the invention, the term "binder resin" means a combination of the resin component constituting the primary polymer particles and the resin component constituting the particulate resin.

The colorant is used in the form of particles having a volume average particle size of preferably 0.01 to 3 μm.

In one preferred embodiment of the invention for obtaining an agglomerate of particles (core material of the toner), the above-described primary polymer particles and the colorant particles are co-agglomerated to obtain the agglomerate of particles.

As the colorant particles, it is preferred to use a substantially water-insoluble organic pigment in the form of an emulsion prepared by emulsifying the pigment in water in the presence of an emulsifier.

Next, the charge control agent to be used in the invention is described below.

In the invention, a charge control agent may be incorporated in the toner as demanded. As a method for incorporating the charge control agent, it is possible to use the charge control agent as a seed simultaneously with the wax upon obtaining the primary polymer particles, to use the charge control agent by dissolving or dispersing in the monomer or the wax, or to agglomerate the primary particles of the charge control agent simultaneously with the primary polymer particles to thereby form an agglomerate of particles for forming a toner, but it is preferred to adhere or fix the primary particles of the charge control agent before, simultaneously with, or after the step of adhering or fixing the particulate resin. In this case, it is preferred to use the charge control agent as an emulsion in water of 0.01 to 3 $\mu$m in average particle size (primary particles of the charge control agent).

As the charge control agent, any of known ones may be used alone or in combination. For example, there are illustrated positively charging agents such as quaternary ammonium salts, basic electron-donative metal materials, etc. and negatively charging agents such as metal chelates, metal salts of organic acids, metal-containing dyes, Nigrosine dyes, amido group-containing compounds, phenolic compounds, naphtholic compounds and the metal salts thereof, urethane bond-containing compounds, acidic or electron-attractive organic substances, etc.

In consideration of adaptability for color toners (the charge control agent itself being colorless or slightly colored and not causing color tone troubles with a toner), the positively charging charge control agents are preferably the quaternary ammonium salt compounds, and the negatively charging charge control agents are preferably salts or complex salts of a metal (e.g., chromium, zinc or aluminum) with salicylic acid or alkylsalicylic acid, metal salts or metal complex salts of benzylic acid, amide compounds, phenolic compounds, naphtholic compounds, phenolamide compounds, and hydroxynaphthalene compounds (e.g., 4,4'-methylenebis[2-[N-(4-chlorophenyl)amido]-3-hydroxynaphthalene]. The amount of the charge control agent may be determined depending upon the charged amount required for the toner, and is usually 0.01 to 10 parts by weight, preferably 0.1 to 10 parts by weight, based on 100 parts by weight of the binder resin.

In the invention, it is also possible to agglomerate the primary polymer particles to form an agglomerate of particles, followed by adhering or fixing the particulate resin ("particulate resin" being described hereinafter) to the agglomerate to obtain a toner. There are a case where the primary particles in the toner can be observed and a case where the primary particles are fused and the original primary particles cannot be observed, depending upon conditions for producing the toner.

In a preferred embodiment of the invention, the toner is of a shape wherein the primary polymer particles and the particulate resin are fused to each other, with the boundary therebetween being obscure or not found.

In another preferred embodiment, a crosslinked resin is used in either or both of the primary polymer particles and the particulate resin which covers the agglomerate of particles, thus tetrahydrofuran insolubles being incorporated.

Next, the particulate resin to be used in the invention is described below.

The particulate resin is used as an emulsion prepared by dispersing in water or a liquid containing water as a major component using an emulsifier (the surfactant described hereinbefore). The particulate resin is preferably that which is obtained by emulsion polymerization.

In addition, it is preferred that the particulate resin substantially does not contain the wax. Additionally, the term "substantially does not contain the wax" means that the content of wax in the particulate resin is 1% by weight or less, preferably 0.5% by weight or less, more preferably 0.1% by weight or less. In the case where the particulate resin substantially does not contain the wax, the wax difficultly oozes to the surface of the toner before fixing of the toner by a fixing apparatus, stains of the apparatus can be prevented, and there results a good anti-blocking property.

As the particulate resin, those which have a volume average particle size of preferably 0.02 to 3 $\mu$m, more preferably 0.05 to 1.5 $\mu$m, and which are obtained by polymerizing the same monomers as are used for producing the primary polymer particles described hereinbefore, may be used.

The resin to be used for the particulate resin are preferably crosslinked.

As the crosslinking agents, those multi-functional monomers which are used for the primary polymer particles described above may be used.

The crosslinking degree in the case of using the crosslinked resin for the particulate resin is such that the content of tetrahydrofuran insolubles usually becomes 5% by weight or more, preferably 10% by weight or more, more preferably 15% by weight or more, particularly preferably 60% or more, and becomes usually 70% by weight or less. In order to adjust the content of the tetrahydrofuran insolubles within the above-described preferred range, the multi-functional monomer is to be compounded in an amount of preferably 0.005% by weight or more, more preferably 0.01% by weight or more, particularly preferably 0.05% by weight or more, based on the weight of the monomer mixture used for the particulate resin. Also, the content is preferably 5% by weight or less, more preferably 3% by weight or less, particularly preferably 1% by weight or less.

Of the components constituting the particulate resin, tetrahydrofuran solubles have a molecular weight peak (Mp) of preferably 30,000 or more, more preferably 40,000 or more, and preferably 150,000 or less, more preferably 100,000 or less.

Particularly, in the case of using the crosslinked resin, the molecular weight peak is preferably 100,000 or less, more preferably 60,000 or less.

Of the components constituting the particulate resin, tetrahydrofuran solubles have a weight average molecular weight (Mw) of preferably 30,000 or more, more preferably 50,000 or more, and preferably 500,000 or less, more preferably 300,000 or less.

Next, the agglomerate step of agglomerating the above-described respective particles is described below.

In a preferred embodiment of the invention, the above-described primary polymer particles, colorant particles and, if necessary, particulate charge control agent, particulate wax, and other internal additives are respectively emulsified to prepare emulsion liquid, followed by co-agglomerating them to form an agglomerate of particles. Of the components to be agglomerated, a dispersion liquid of the charge control agent may be added during or after the agglomerate step.

Here, as a method for conducting the agglomerate step, there are 1) a method of heating to conduct agglomeration, and 2) a method of adding an electrolyte to conduct agglomeration. These methods may be combined with each other.

In the agglomerate step of the invention, the sum concentration of solid contents in the agglomerating liquid is 10 to 40% by weight, preferably 10 to 20% by weight.

In the case of conducting agglomeration by heating, the agglomerating temperature is specifically a temperature of 5° C. to Tg (Tg being the glass transition temperature of the primary polymer particles), with Tg−10° C. to Tg−5° C. being more preferred. As long as the agglomeration temperature is within the above-described range, the particles can be agglomerated to a preferred toner particle size without using the electrolyte.

In addition, in the case of conducting an aging step subsequent to the agglomerate step in the agglomerating method by heating, sometimes the agglomerate step and the aging step are conducted continuously, and hence the boundary therebetween becomes obscure. However, if there exists a step during which the temperature is kept in a range of from Tg−20° C. to Tg for at least 30 minutes, this step is regarded as the agglomerate step.

In the agglomerate step, the temperature is usually preferably kept at a predetermined level for at least 30 minutes to obtain toner particles with a desired particle size. The temperature may be raised at a constant rate or in a stepwise manner up to the predetermined level. The temperature is kept at a level of from Tg−20° C. to Tg for preferably 30 minutes to 8 hours, more preferably 1 hour to shorter than 4 hours. The agglomerate step under such conditions provides a toner with a small particle size and a sharp particle size distribution.

As electrolytes to be added to the mixed dispersion liquid to conduct the agglomeration, either an organic salt or an inorganic salt may be used. Specifically, there are illustrated NaCl, KCl, LiCl, $Na_2SO_4$, $K_2SO_4$, $Li_2SO_4$, $MgCl_2$, $CaCl_2$, $MgSO_4$, $CaSO_4$, $ZnSO_4$, $Al_2(SO_4)_3$, $Fe_2(SO_4)_3$, $CH_3COONa$, and $C_6H_5SO_3Na$. Salts of polyvalent metals having a valency of one, two or more are preferred, with salts of a trivalent metal such as an aluminum salt being more preferred. In particular, $Al_2(SO_4)_3$ is preferred.

The amount of the electrolyte to be added is usually 0.05 to 25 parts by weight, preferably 0.1 to 15 parts by weight, more preferably 0.1 to 10 parts by weight based on 100 parts by weight of the solid contents of the mixed dispersion liquid, although the amount varies depending upon the kind of electrolyte.

The electrolytes may be added alone or in combination of several ones.

In the case of using only monovalent metal salt as the electrolyte, it is added in an amount of usually 0.5 to 50 parts by weight, preferably 5 to 40 parts by weight, more preferably 10 to 35 parts by weight, based on 100 parts by weight of the solid contents of the mixed dispersion liquid.

In the case of using only a divalent metal salt, it is added in an amount of usually 0.1 to 30 parts by weight, preferably 1 to 20 parts by weight, more preferably 5 to 10 parts by weight, based on 100 parts by weight of the solid contents of the mixed dispersion liquid.

In the case of using only a trivalent metal salt, it is added in an amount of usually 0.05 to 50 parts by weight, preferably 0.1 to 5 parts by weight, more preferably 0.3 to 1.5 parts by weight, based on 100 parts by weight of the solid contents of the mixed dispersion liquid.

In case where the amount of the added electrolyte is markedly smaller than the above-described range, the agglomeration reaction proceeds at such a slow rate that, even after completion of the agglomeration reaction, there arise the problem that there remain fine particles of 1 μm or less in particle size or that agglomerate particles of 3 μm or less in average agglomerate size are formed.

In case where the amount of the added electrolyte is increased, change in particle shape in the aging step becomes easy to cause, and shape control can be conducted in a short time, and hence it is preferred to select the amount of the electrolyte in a larger amount within the above-described range. However, in case where the amount of the added electrolyte markedly exceeds the above-described range, there tends to arise a rapid and difficultly controllable agglomeration, which is liable to cause the problem that the resultant agglomerate particles include coarse particles of 25 μm or more, or that the agglomerate of particles is of a distorted and amorphous shape.

In addition, in the case of conducting the agglomeration by adding the electrolyte, the agglomerating temperature is preferably 5° C. to Tg.

In any of the aforesaid methods 1) and 2), a common stirring tank is used in the agglomerate step and, as to shape, a tank of approximately a cylindrical shape or approximately a spherical shape is preferably used. In the case of using an approximately cylindrical reaction tank, there is no limit as to the shape of the bottom, but a common tank with an approximately arc shape is preferably used.

In order to attain a good stirring efficiency, the volume of the mixed dispersion liquid is preferably 2/3 or less of the volume of the reaction tank, with 3/5 or less being more preferred. In case where the volume of the mixed dispersion liquid is extremely small in comparison with the reaction tank, there arises a seriously vigorous foaming and an increased viscosity, and coarse particles are liable to be formed and, with a stirring blade of some shape, stirring becomes impossible, or the production efficiency is reduced. Thus, the ratio is preferably 1/10 or more, more preferably 1/5 or more.

As the stirring blade to be used in the agglomerate step, conventionally known, commercially available stirring blades with various shapes may be used.

As commercially available stirring blades, there may be illustrated, for example, anchor blades, full zone blades (made by Shinko Pantec Co., Ltd.), Sunmeler blades (made by Mitsubishi Heavy Industries Ltd.), Maxblend blades (made by Sumitomo Heavy Industries, Ltd.), Hi-F mixer blades (made by Soken Kagaku K.K. ), double helical ribbon blades (made by Shinko Pantec Co., Ltd.), etc. The stirring tank may be equipped with a baffle.

Usually, a preferred stirring blade is selected from among these stirring blades depending upon physical properties such as viscosity of the reaction liquid, or reaction type, shape and size of the reaction tank. Specific preferred stirring blades include the double helical ribbon blades and the anchor blades, with the double helical ribbon blades being more preferred.

In the invention, it is preferred to form toner particles by covering (adhering or fixing) the surface of the agglomerate of particles after the above-described agglomerating treatment with, if necessary, the particulate resin. Additionally, in the case of adding the above-described charge control agent after the agglomerating treatment, it is preferred to add the particulate resin after adding the charge control agent to the dispersion liquid containing the agglomerate of particles.

Next, in the process of the invention for producing a toner, an aging step is added, subsequent to the agglomerate step, in which agglomerate particles are fused to each other by keeping at a temperature higher than the glass transition temperature (Tg) of the primary polymer particles by 10° C. or more for a predetermined period of time in order to increase stability of the agglomerate particles (toner particles) obtained by the agglomeration.

The temperature in the agglomerate step is usually Tg+80° C. or lower and the softening temperature of the primary polymer particles or lower, preferably in the range of from Tg+20° C. to Tg+80° C., and the softening temperature of the primary polymer particles or lower. By adding the aging step, the toner particle can be made approximately spherical, and control of the shape becomes possible. This aging step is usually conducted for 1 hour to 24 hours, preferably 2 hours to 10 hours.

Now, the dispersion liquid containing the agglomerate of particles which has been subjected to the above-described aging step contains a considerable amount of residual monomers, and it is preferred to add a pyrolytic free radical initiator to the dispersion liquid containing the agglomerate of particles in the aging step in order to remove the residual monomers.

As the pyrolytic free radical initiator to be used in the above-described aging step, known water-soluble, polymerization initiators commonly used as polymerization initiators may be used. To be specific, there may be used persulfates such as potassium persulfate, sodium persulfate, ammonium persulfate, etc., a redox initiator wherein the persulfate is combined as one component with a reducing agent such as sodium hydrogensulfite or the like, water-soluble polymerization initiators such as hydrogen peroxide, 4,4'-azobiscyanovaleric acid, t-butylhydroperoxide, cumene peroxide, etc., a redox initiator system wherein the water-soluble polymerization initiator is combined as one component with a reducing agent such as a ferrous salt or the like, benzoyl peroxide, 2,2'-azobisisobutyronitrole, etc. Of these, persulfates are preferred. The amount of the pyrolytic free radical initiator is usually 0.1 to 3% by weight, preferably 0.3 to 2% by weight, more preferably 0.4 to 1% by weight, based on the weight of the polymer component in the dispersion liquid containing the agglomerate of particles.

In order to prevent agglomeration of the agglomerate particles in the aging step, it is necessary to add a surfactant or raise the pH value of the agglomerate liquid before subjecting the liquid to the aging step. By adding either or both of a surfactant and a pH adjusting agent, the agglomerate step is completed. The surfactant and the pH adjusting agent function as agglomerate reaction terminators. Subsequently, the temperature of the reaction liquid was raised to a predetermined level to initiate the aging step.

By providing the aging step, shape of the toner particles can be made approximately spherical, and control of shape is made possible. Degree of ease of changing shape of the toner particles depends upon the glass transition temperature (Tg) and softening temperature (Sp) of the agglomerate particles composed of the primary polymer particles and other additives. The higher the the glass transition temperature (Tg) or softening temperature (Sp) of the agglomerate particles, the more difficult becomes change of the shape of toner particles, and hence a longer aging period of time is required for the toner particles to acquire a definite shape. In some cases, it becomes impossible to control the shape. In addition, there arises the possibility that coarse particles of 15 μm or larger in particle size exerting detrimental influences upon the properties of the toner might be generated by the prolonged aging.

The production process of the present invention is characterized in reducing the concentration of solid contents of the dispersion liquid in the aging step to a predetermined level lower than that in the agglomerate step to thereby facilitating control of the shape of toner particles. While the concentration of solid contents (C1) in the agglomerate step is 10 to 40% by weight, the concentration of solid contents of the dispersion liquid is reduced at or after the completion of the agglomerate step and the concentration of solid contents (C2) in the aging step is adjusted to a level of $0.3C1 \leqq C2 \leqq 0.8C1$. By thinning the dispersion liquid of toner particles, it becomes easy to change shape of the toner particles, and it becomes possible to control the shape in a short time. In addition, the thinner the concentration of the dispersion liquid, the easier becomes the control of shape of toner particles. As a means to reduce the concentration, addition of water is preferred. The concentration of solid contents (C2) in the agglomerate step is preferably 0.5C1 or more, and 0.7C1 or less. The preferred range of C2 in this occasion is 3 to 32% by weight, with a range of from 7 to 25% by weight being more preferred.

Water to be mixed for adjusting the concentration of solid contents may be mixed at completion of the agglomerate step, during the subsequent period where the temperature is raised, or after the temperature reaches the predetermined agglomerating temperature. However, it is preferred to mix water earlier, and thus it is preferred to mix water upon completion of the agglomerate step, i.e., simultaneously with the addition of the surfactant and/or the pH adjusting agent functioning as the agglomerate terminator. In addition, it is preferred to add before the temperature of the solution reaches Tg+10° C.

The aging step can be conducted using the same stirring tank as that used in the agglomerate step. The dispersion liquid in the aging step has a lower concentration of solid contents than in the agglomerate step, and hence the volume of the liquid in the aging step is larger. Therefore, when the aging step is conducted in the same stirring tank as in the agglomerate step, there is obtained the effect that the amount of particles adhering to the wall of the stirring tank is decreased, which serves to improve the yield of toner.

The toner particles thus obtained through the above-described steps are subjected to solid-liquid separation in a known manner to recover the toner particles and, if necessary, washed, followed by drying.

The amount of residual monomers remaining in the thus dried toner is preferably 100 ppm or less, more preferably 50 ppm or less.

The toner obtained by the process of the invention can be used together with, if necessary, additives such as a plasticizer. As such plasticizers, there are specifically illustrated fine powders such as hydrophobic silica, titanium oxide, aluminum oxide, etc. These are used in an amount of usually 0.01 to 5 parts by weight, preferably 0.1 to 3 parts by weight, per 100 parts by weight of the binder resin.

Further, for the toner obtained by the process of the invention, inorganic fine powders such as magnetite, ferrite, cerium oxide, strontium titanate and electroconductive titania, resistivity adjusters such as styrene resin and acrylic resin, and lubricants may be used as internal additives or external additives. Amounts of these additives may properly be selected depending upon desired properties, and are usually about 0.05 to about 10 parts by weight per 100 parts by weight of the binder resin.

The toner of the invention for developing electrostatic image may be used in the form of either of a two-component type developer and a non-magnetic, one-component type developer. In the case of using the toner as the two-component type developer, known carriers such as magnetic materials (e.g., iron powder, magnetite powder, ferrite powder, etc.) or those prepared by coating the surface of these materials with a resin, and magnetic carriers. As the coating resin for the resin-coated carriers, there may be utilized commonly known styrene series resins, acrylic resins, styrene-acryl copolymer series resins, silicone resins, modified silicone resins, fluorine-containing resins or the mixture thereof.

In the case of using the toner of the invention for a printer or a copying machine with a high resolution, the toner preferably has a comparatively small particle size and a sharp particle size distribution because charged amounts of the individual toner particles are easy to be made uniform.

The toner of the invention has a volume average particle size of usually 3 to 12 μm, preferably 4 to 10 μm, more preferably 5 to 9 μm, particularly preferably 6 to 8 μm. The particle size distribution of the toner in terms of the ratio of volume average particle size (DV) to number average particle size (DN), DV/DN, is preferably 1.25 or less, more preferably 1.22 or less, particularly preferably 1.20 or less. The minimum value of DV/DN is 1, which means that all particles have the same diameter. Although a toner with a DV/DN value of 1 is advantageous for forming images with a high resolution, it is extremely difficult to actually obtain th particle size distribution of 1, and hence, in view of production capability, DV/DN is 1.03 or more, preferably 1.05 or more.

The invention is described in more detail by reference to the following Examples which, however, do not limit the invention in any way.

"Parts" used in the following description means "parts by weight". Average particle size, particle size distribution, weight average molecular weight, glass transition point (Tg), 50% circular degree, temperature range for fixing, OHP transparency, charged amount, blocking resistance, tetrahydrofuran insolubles, melting point of wax, amount of residual monomers, and viscoelasticity were respectively measured according to the following methods.

Volume average particle size, number average particle size, ratios of toner particles of 5 μm or less in particle size and toner particles of 15 μm or more in particle size: Measured using LA-500 made by Horiba K.K., a Microtrack UPA (ultra particle analyzer) made by Nikkiso K.K. or a Coulter Counter Multisizer Model II (hereinafter abbreviated as Coulter Counter) made by Coulter Co.

Weight average molecular weight (Mw), molecular weight peak (Mp): Measured by gel permeation chromatography (GPC) (apparatus: a GPC apparatus, HLC-8020, made by Tosoh Corporation; column: PL-gel Mixed-B 10 μ made by Polymer Laboratory Co.; solvent: THF; sample concentration: 0.1 wt %: calibration curve: standard polystyrene).

Glass transition temperature (Tg): Measured by means of DSC7 made by Parkin Elmer Co. (Tg value obtained by increasing the temperature of a sample from 30° C. to 100° C. in 7 minutes, rapidly cooling from 100° C. to −20° C., increasing from −20° C. to 100° C. in 12 minutes, and observing Tg during the second temperature-increasing stage was used.)

50% circular degree: A toner was measured by means of a flow type particle picture analyzer, FPIA-2000, made by Sysmex Corporation, and a circular degree corresponding to cumulative particle size value at 50% determined by the following formula was used:

$$\text{Circular degree} = \frac{\text{peripheral length of a circle having the same area as the projected area of a particle}}{\text{peripheral length of the projected image of the particle}}$$

Range of fixing temperature: A recording paper carrying an unfixed toner image was prepared, and was carried to a fixing nip with changing the surface temperature of a heating roller from 100° C. to 220° C., and the fixed state of the discharged paper was observed. A temperature range wherein the offset of toner was not generated on the heating roller at the fixing and the toner on the recording paper was sufficiently adhered to the paper after the fixing was taken as the range of fixing temperature.

The heating roller used in the fixing apparatus comprises a core metal of aluminum, an elastic layer of 1.5-mm thick dimethyl series, low temperature vulcanizable silicone rubber having a rubber hardness of 3 according to JIS-A standard, and a releasing layer of a 50-μm thick PFA (tetrafluoroethylene-perfluoroalkyl vinyl ether copolymer), has a diameter of 30 mm and a rubber hardness of the fixing roller surface measured according to the standard provided by Nihon Gomu Kyokai of SRIS 0101 of 80. The evaluation was conducted without coating a silicone oil and with a nip width of 4 mm. Fixing rate was 120 mm/s or 30 mm/s.

Additionally, since the evaluation was conducted in the range of from 100° C. to 220° C., those with which the upper limit of the fixing temperature is described to be 220° C. may possibly have a higher upper limit, basically.

OHP transparency: An unfixed toner image on an OHP sheet was fixed using the above-described fixing roller under the conditions of 30 mm/s in fixing rate, 180° C. in temperature, and not coating with a silicone oil, followed by measuring transmittance using a spectrophotometer (made by Hitachi Ltd.;U-3210) in the wavelength range of from 400 nm to 700 nm. Remainder obtained by subtracting the transmittance at a wavelength of the lowest transmittance (minimum transmittance (%)) from the transmittance at a wavelength of the highest transmittance (maximum transmittance (%)), maximum transmittance—minimum transmittance, was used as the value.

Charge amount: A toner was charged in a developing layer for non-magnetic, one-component type toners (developing layer, Color Page Presto N4, made by Kashio K.K.) and, after rotating the roller predetermined times, the toner on the roller was sucked, and charged amount per unit weight was determined from the charged amount (measured by means of Blowoff made by Toshiba Chemical K.K.) and the weight of the sucked toner.

Blocking resistance: 10 g of a toner for development was charged in cylindrical vessel, a load of 20 g was placed thereon and, after leaving for 5 hours under the circumstances of 50° C., the toner was taken out of the vessel, followed by applying a load to confirm the degree of agglomeration.

O: No agglomeration

Δ: Agglomeration was confirmed, but was broken by a light load.

x: Agglomeration was confirmed, and was not broken even by applying a load.

Tetrahydrofuran (THF) insolubles: Tetrahydrofuran insolubles of the toner, the primary polymer particles and the particulate resin were measured by adding 1 g of a sample to 100 g of tetrahydrofuran, allowing to stand at 25° C. for 24 hours to dissolve, filtering using 10 g of Celite, distilling off the solvent of the filtrate to determine the tetrahydrofuran solubles, and subtracting th determined value from 1 g to calculate the tetrahydrofuran insolubles.

Melting point of wax: Measurement was conducted at a temperature-raising rate of 10° C./min using DSC-20 made by Seiko Instruments K.K. A temperature of peak at which the heat absorption became maximal in the DSC curve was taken as the melting point of the wax.

Amount of residual monomers: Measured by gas chromatography (GC) under the following conditions.

Measuring Conditions:

Column: DB-1 0.32 mm ID×25 m; 0.52-μm thin film

Carrier gas: helium, 2.0 ml/min

Oven temperature: 50° C. (for 5 minutes) to 80° C., 5° C./min

Injection inlet: 200° C.

Injected amount: 1 μl

Detector: FID 200° C.

Make-up gas: helium 40 ml/min

Viscoelasticity: Measured under the following conditions.

Measuring Conditions:

Apparatus: RDAII (made by Rheometric Scientific F.E. Ltd.)

Preparation of sample: A toner was heated (50° C.), and molded under pressure to form a columnar sample of about 8 mm in diameter and 3 to 5 mm in thickness.

Measurement: Visoelasticity was measured from room temperature to 200° C. with a temperature-raising rate of 2° C. using parallel plates of 7.9 mm in diameter Distortion: Measured in an automatic mode with setting the initial level at 0.1%.

Frequency: 6.28 rad/sec

Tetrahydrofuran insolubles: 1 g of a toner was added to 50 g of tetrahydrofuran, allowed to stand at 25° C. for 24 hours to dissolve, filtered using 10 g of Celite, followed by removing the solvent of the filtrate to determine the tetrahydrofuran solubles, and subtracting the determined value from 1 g to calculate the tetrahydrofuran insolubles.

EXAMPLE 1

(Wax Dispersion Liquid-1)

68.33 parts of desalted water, 30 parts of a 7:3 mixture of an ester mixture containing behenyl behenate as a major component (Unister M-2222SL; made by NOF Corporation) and an ester mixture containing stearyl stearate as a major component (Unister M9676; made by NOF Corporation), and 1.67 parts of sodium dodecylbenzenesulfonate (Neogen SC; made by Dai-ichi Kogyo Seiyaku Co., Ltd.; content of effective ingredients: 66%) were mixed and emusified by applying a high-pressure shearing force at 90° C. to obtain a dispersion liquid of the particulate ester wax. Average particle size of the particulate ester wax measured by means of LA-500 was 340 nm.

(Dispersion Liquid-1 of Primary Polymer Particles)

43 parts of the wax dispersion liquid-1 and 401 parts of desalted water were charged in a reactor (volume: 3 liters; inside diameter: 130 mm) equipped with a stirring element (full zone blades), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 8% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| | |
|---|---|
| [Monomers] | |
| Styrene | 78 parts (237 g) |
| Butyl acrylate | 22 parts |
| Acrylic acid | 3 parts |
| Octanethiol | 0.38 part |
| 2-Mercaptoethanol | 0.01 part |
| Hexanediol diacrylate | 0.9 part |
| [Aqueous solution of an emulsifier] | |
| 15% Neogen SC aqueous solution | 1 part |
| Desalted water | 25 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight of 196,000, an average particle size measured by UPA of 210 nm, and a Tg of 53° C.

(Dispersion Liquid-1 of a Particulate Resin)

5 parts of 15% Neogen SC aqueous solution and 372 parts of desalted water were charged in a reactor (volume: 60 liters; inside diameter: 400 mm) equipped with a stirring element (3-blade type), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 8% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| [Monomers] | |
|---|---|
| Styrene | 88 parts (6160 g) |
| Butyl acrylate | 12 parts |
| Acrylic acid | 2 parts |
| Bromotrichloromethane | 0.5 part |
| 2-mercaptoethanol | 0.01 part |
| Hexanediol diacrylate | 0.4 part |
| [Aqueous solution of an emulsifier] | |
| 15% Neogen SC aqueous solution | 2.5 parts |
| Desalted water | 24 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight of 54,000, an average particle size measured by UPA of 83 nm, and a Tg of 85° C.

(Dispersion Liquid-1 of Particulate Colorant)

An aqueous dispersion liquid of Pigment Blue 15:3 (EP-700 Blue GA; made by Dainichiseika Color & Chemicals Mfg.; solid content: 35%). Average particle size measured by means of UPA was 150 nm.

(Dispersion Liquid-1 of Particulate Charge Control Agent)

20 parts of 4,4'-methylenebis[2-[N-(4-chlorophenyl)-amido]-3-hydroxynaphthalene], 4 parts of an alkylnaphthalenesulfonic acid salt and 76 parts of desalted water were dispersed in a sand grinder mill to obtain a dispersion liquid of particulate charge control agent. Average particle size measured by means of UPA was 200 nm.

Production-1 of a Toner for Development:

| | |
|---|---|
| Dispersion liquid-1 of the primary polymer particles | 106 parts (218 g: as solid content) |
| Dispersion liquid-1 of the particulate resin | 5 parts (as solid content) |
| Dispersion liquid-1 of the particulate colorant | 6.7 parts (as solid content) |
| Dispersion liquid-1 of particulate charge control agent | 2 parts (as solid content) |
| 15% Neogen SC aqueous solution | 0.5 part (as solid content) |

A toner was produced in the following procedures using the respective components described above.

The dispersion liquid of primary polymer particles and the 15% Neogen SC aqueous solution were charged in a reactor (volume: 2 liters; baffled double helical blades) and, after uniformly mixing the mixture, the dispersion liquid of particulate colorant was added thereto, followed by uniformly mixing it. To the thus obtained mixed dispersion liquid was dropwise added an aqueous solution of aluminum sulfate (0.6 part as solid content) under stirring. Then, the temperature of the mixture was raised to 50° C. in 30 minutes under stirring, and was kept at the temperature for 1 hour, followed by raising the temperature to 55° C. in 5 minutes and keeping the temperature at the level for 1.5 hours. Then, the dispersion liquid of particulate charge control agent, the dispersion liquid of particulate resin, and the aqueous solution of aluminum sulfate (0.07 part as solid content) were added thereto in this order, and the temperature was raised to 58° C. in 3 minutes, then kept at the level for 30 minutes. After adding thereto the 15% Neogen SC aqueous solution (3 parts as solid content) and 1 liter of pure water (460 parts), the temperature was raised to 95° C. in 40 minutes, then kept at the level for 2 hours. Thereafter, the mixture was cooled, filtered, washed with water, and dried to obtain a toner (toner-1).

Evaluation-1 of the Toner:

The toner-1 had a volume average particle size of 7.4 μm measured by Coulter Counter, contained particles of 5 μm or less in volume particle size in a ratio of 2.1% and particles of 15 μm or more in volume particle size in a ratio of 0.8%, and a ratio of volume average particle size to the number average particle size of 1.11.

50% circular degree was found to be 0.96.

EXAMPLE 2

(Wax Dispersion Liquid-2)

68.33 parts of desalted water, 30 parts of pentaerythritol ester of stearic acid (Unister H476; made by NOF Corporation) and 1.67 parts of Neogen SC were mixed and emusified by applying a high-pressure shearing force at 90° C. to obtain a dispersion liquid of the particulate ester wax. Average particle size of the particulate ester wax measured by means of LA-500 was 350 nm.

(Dispersion Liquid-2 of Primary Polymer Particles)

28 parts of the wax dispersion liquid-2, 1.2 parts of the 15% Neogen SC aqueous solution and 393 parts of desalted water were charged in a reactor (volume: 60 liters; inside diameter: 400 mm) equipped with a stirring element (three-blade type), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 8% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| [Monomers] | |
|---|---|
| Styrene | 79 parts (5530 g) |
| Butyl acrylate | 21 parts |
| Acrylic acid | 3 parts |
| Bromotrichloromethane | 0.45 part |
| 2-mercaptoethanol | 0.01 part |
| Hexanediol diacrylate | 0.9 part |
| [Aqueous solution of an emulsifier] | |
| 15% Neogen SC aqueous solution | 1 part |
| Desalted water | 25 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight of 167,000, an average particle size measured by UPA of 216 nm, and a Tg between 55 to 60° C. though obscure due to overlapping with the melting point of the wax.

(Dispersion Liquid-2 of a Particulate Resin)

The same one as the dispersion liquid-1 of the particulate resin was used.

(Dispersion Liquid-2 of Particulate Charge Control Agent)

The same one as the dispersion liquid-1 of the particulate charge control agent was used.

Production-2 of a Toner for Development:

| | |
|---|---|
| Dispersion liquid-2 of the primary polymer particles | 103 parts (222 g: as solid content) |
| Dispersion liquid-2 of the particulate resin | 5 parts (as solid content) |
| Dispersion liquid-1 of the particulate colorant | 6.7 parts (as solid content) |
| Dispersion liquid-2 of particulate charge control agent | 2 parts (as solid content) |
| 15% Neogen SC aqueous solution | 0.5 part (as solid content) |

A toner was produced in the following procedures using the respective components described above.

The dispersion liquid of primary polymer particles and the 15% Neogen SC aqueous solution were charged in a reactor (volume: 2 liters; baffled double helical blades) and, after uniformly mixing the mixture, the dispersion liquid of particulate colorant was added thereto, followed by uniformly mixing it. To the thus obtained mixed dispersion liquid was dropwise added an aqueous solution of aluminum sulfate (0.6 part as solid content) under stirring. Then, the temperature of the mixture was raised to 55° C. in 20 minutes under stirring, and was kept at the level for 1 hour, followed by raising the temperature to 65° C. in 10 minutes and keeping the temperature at the level for 0.5 hours. Then, the dispersion liquid of particulate charge control agent, the dispersion liquid of particulate resin, and the aqueous solution of aluminum sulfate (0.07 part as solid content) were added thereto in this order, and the temperature was raised to 68° C. in 3 minutes, then kept at the level for 30 minutes. After adding thereto the 15% Neogen SC aqueous solution (3 parts as solid content) and 1 liter (460 parts) of pure water (460 parts), the temperature was raised to 95° C. in 50 minutes, then kept at the level for 2 hours. Thereafter, the mixture was cooled, filtered, washed with water, and dried to obtain a toner (toner-2).

0.6 part of silica having been surface-treated for imparting hydrophilicity was mixed with 100 parts of the toner, followed by stirring to obtain a toner for development (developing toner-2).

Evaluation-2 of the Toner:

The toner-2 had a volume average particle size of 7.8 μm measured by Coulter Counter, contained particles of 5 μm or less in volume particle size in a ratio of 1.0% and particles of 15 μm or more in volume particle size in a ratio of 0.2%, and a ratio of volume average particle size to the number average particle size of 1.11.

50% circular degree was found to be 0.96.

As to fixing properties of the developing toner-2, it was fixed at 170 to 220° C. when fixed at a fixing rate of 120 mm/S, and fixed at 130 to 220° C. when fixed at a fixing rate of 30 mm/S. OHP transparency was found to be 70%.

Toner-2 showed a charged amount of −7 μC/g, and developing toner-2 showed a charged amount of −15 μC/g. Blocking resistance was "O".

EXAMPLE 3

Production-3 of a Toner for Development:

The agglomerate step and the aging step were conducted in the same manner as in Example 2 except for adding 1 liter of pure water after raising the temperature to 95° C. in place of adding before raising the temperature to 95° C. Thus, there was obtained particles at 95° C. for 2 hours without forming coarse particles, with the circular degree being 0.96. Thereafter, the product was cooled, filtered, washed with water, and dried to obtain a toner (toner-3).

Evaluation-3 of the Toner:

The toner 3 had a volume average particle size of 7.6 μm measured by Coulter Counter, contained particles of 5 μm or less in volume particle size in a ratio of 0.9% and particles of 15 μm or more in volume particle size in a ratio of 0.3%, and a ratio of volume average particle size to the number average particle size of 1.10. 50% cirdular degree was found to be 0.96.

COMPARATIVE EXAMPLE 1

Production-4 of a Toner for Development:

The agglomerate step and the aging step were conducted in the same manner as in Example 2 except for omitting to add 1 liter of pure water before raising the temperature to 95° C. Thus, there was obtained particles at 95° C. for 2 hours with the circular degree being only 0.94 or at 95° C. for 4 hours with the circular degree being still 0.95. Coarse particles were formed in a small amount. And, in comparison with the case of Example 2, there was observed much adhesion of solid contents to the inside of the reactor and the blades above the liquid level. The ratio of the sum of the amount of the adhered solid contents and the amount of the coarse particles to the theoretical toner amount was 1.3% by weight. (Additionally, the same ratio in Example 2 was 0.7% by weight.) Thereafter, the product was cooled, filtered, washed with water, and dried to obtain a toner (toner-4).

Evaluation-4 of the Toner:

The toner-4 had a volume average particle size of 7.9 μm measured by Coulter Counter, contained particles of 5 μm or less in volume particle size in a ratio of 0.7% and particles of 15 μm or more in volume particle size in a ratio of 1.9%, and a ratio of volume average particle size to the number average particle size of 1.11. 50% circular degree was found to be 0.95.

Changes in the solid contents and in circular degree upon aging and the proportion of toner particles having a particle size of 15 μm or more in Examples 1 to 3 and Comparative Example 1 are tabulated in Table 1.

TABLE 1

| | Temperature Upon Adding Water | Concentration of Solid Content upon Agglomeration (C1) | Concentration of Solid Content upon Aging (C2) | C2/C1 | Circular Degree at 95° C. (50%) 1 hr | 2 hrs | 4 hrs | Coarse Particles of 15 μm or more in particle size |
|---|---|---|---|---|---|---|---|---|
| Example 1 | 58° C. | 16.1 wt % | 9.8 wt % | 0.61 | 0.95 | 0.96 | — | 0.8% |
| Example 2 | 68° C. | 16.6 wt % | 9.9 wt % | 0.60 | 0.95 | 0.96 | — | 0.2% |
| Example 3 | 95° C. | 16.6 wt % | 9.9 wt % | 0.60 | 0.94 | 0.96 | — | 0.3% |

TABLE 1-continued

| | Temperature Upon Adding Water | Concentration of Solid Content upon Agglomeration (C1) | Concentration of Solid Content upon Aging (C2) | C2/C1 | Circular Degree at 95° C. (50%) 1 hr | 2 hrs | 4 hrs | Coarse Particles of 15 μm or more in particle size |
|---|---|---|---|---|---|---|---|---|
| Comparative Example 1 | none | 16.6 wt % | 16.0 wt % | 0.96 | 0.93 | 0.94 | 0.95 | 1.9% |

It is seen from the results that deformation of agglomerate particles is facilitated by the addition of water upon aging, whereby the intended circular degree can be attained in a short time with generating a less amount of coarse particles upon aging.

EXAMPLE 4

(Dispersion Liquid-3 of Primary Polymer Particles)

30 parts of the wax dispersion liquid-2, 1.2 parts of a 15% aqueous solution of Neogen SC and 393 parts of desalted water were charged in a reactor (volume: 2 $m^3$) equipped with a stirring element (Maxblend blades; made by Sumitomo Heavy Industries, Ltd.), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 9% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| | |
|---|---|
| [Monomers] | |
| Styrene | 79 parts (236 Kg) |
| Butyl acrylate | 21 parts |
| Acrylic acid | 3 parts |
| Bromotrichloromethane | 0.45 part |
| 2-mercaptoethanol | 0.009 part |
| Hexanediol diacrylate | 0.8 part |
| [Aqueous solution of an emulsifier] | |
| 15% Neogen SC aqueous solution | 1 part |
| Desalted water | 25 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight of 222,000, an average particle size measured by UPA of 200 nm, and a Tg between 55 and 60° C. though obscure due to overlapping with the melting point of the wax.

(Dispersion Liquid-3 of a Particulate Resin)

5 parts of 15% Neogen SC aqueous solution and 372 parts of desalted water were charged in a reactor (volume: 2 $m^3$) equipped with a stirring element (Maxblend blades; made by Sumitomo Heavy Industries, Ltd.), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 8% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| | |
|---|---|
| [Monomers] | |
| Styrene | 88 parts (308 Kg) |
| Butyl acrylate | 12 parts |
| Acrylic acid | 2 parts |
| Bromotrichloromethane | 0.5 part |
| 2-mercaptoethanol | 0.01 part |
| Hexanediol diacrylate | 0.4 part |
| [Aqueous solution of an emulsifier] | |
| 15% Neogen SC aqueous solution | 2.5 parts |
| Desalted water | 24 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight of 87,000, an average particle size measured by UPA of 123 nm, and a Tg of 85° C.

Production-5 of a Toner for Development:

| | |
|---|---|
| Dispersion liquid-3 of the primary polymer particles | 95 parts (219 g: as solid content) |
| Dispersion liquid-3 of the particulate resin | 5 parts (as solid content) |
| Dispersion liquid-1 of the particulate colorant | 6.7 parts (as solid content) |

A toner was produced in the following procedures using the respective components described above.

The dispersion liquid of primary polymer particles and the dispersion liquid of particulate colorant were charged in a reactor (volume: 2 liters; baffled double helical blades), followed by uniformly mixing the mixture. An aqueous solution of aluminum sulfate was dropwise added to the resultant mixed dispersion liquid under stirring (0.8 part as solid content). Then, the temperature of the mixture was raised to 45° C. in 30 minutes under stirring, and was kept at the level for 1 hour, followed by raising the temperature to 55° C. in 45 minutes and keeping the temperature at the level for 1.5 hours. Then, the dispersion liquid-3 of particulate resin and the aqueous solution of aluminum sulfate (0.04 part as solid content) were added thereto in this order, and the temperature was raised to 58° C. in 3 minutes, then kept at the level for 30 minutes. After adding thereto the 15% Neogen SC aqueous solution (5 parts as solid content) and 870 ml of pure water (380 parts), the temperature was raised to 95° C. in 40 minutes, then kept at the level for 3 hours. Thereafter, the mixture was cooled, filtered, washed with water, and dried to obtain a toner (toner-5).

Evaluation-5 of the Toner:

The toner-5 had a volume average particle size of 7.5 μm measured by Coulter Counter, contained particles of 5 μm or less in volume particle size in a ratio of 3.0% and particles of 15 μm or more in volume particle size in a ratio of 2.3%, and a ratio of volume average particle size to the number average particle size of 1.16. 50% circular degree was found to be 0.97.

EXAMPLE 5

Production-6 of a Toner for Development:

The agglomerate step and the aging step were conducted in the same manner as in Example 4 except for changing the amount of aluminum sulfate added to the mixed dispersion liquid of dispersion liquid of the primary polymer dispersion and the dispersion liquid of particulate colorant from 0.8 part to 0.4 part and changing the amount of Neogen SC added before the aging step from 5 parts to 3 parts as solid contents. The circular degree increased only to 0.94 after aging at 95° C. for 3 hours. Thereafter, the mixture was cooled, filtered, washed with water, and dried to obtain a toner (toner-6).

Evaluation-6 of the Toner:

The toner-6 had a volume average particle size of 7.6 μm measured by Coulter Counter, contained particles of 5 μm or less in volume particle size in a ratio of 1.5% and particles of 15 μm or more in volume particle size in a ratio of 0.4%, and a ratio of volume average particle size to the number average particle size of 1.11. 50% cirdular degree was found to be 0.94.

Changes in the solid contents, in concentration of electrolyte, and in circular degree upon aging in Examples 4 and 5 are tabulated in Table 2.

TABLE 2

| | Concentration of $Al_2(SO_4)_3$ | Concentration of Solid Content upon Agglomeration | Concentration of Solid Content upon Aging | | Circular Degree at 95° C. (50%) | | |
|---|---|---|---|---|---|---|---|
| | upon Aging | (C1) | (C2) | C2/C1 | 1 hr | 2 hrs | 3 hrs |
| Example 4 | 0.074% | 16.9 wt % | 10.8 wt % | 0.63 | 0.93 | 0.96 | 0.97 |
| Example 5 | 0.044% | 15.3 wt % | 9.5 wt % | 0.62 | 0.93 | 0.94 | 0.94 |

It is seen from the results that deformation of agglomerate particles is easier when the concentration of the electrolyte upon aging is thicker, whereby the intended circular degree can be attained in a short time.

EXAMPLE 6

(Wax Dispersion Liquid-3)

68.33 parts of desalted water, 30 parts of pentaerythritol ester of stearic acid (Unister H-476; made by NOF Corporation) and 1.67 parts of sodium dodecylbenzene-sulfonate (Neogen SC; made by Dai-ichi Kogyo Seiyaku Co,. Ltd.; content of effective ingredients: 66%) were mixed and emusified by applying a high-pressure shearing force at 90° C. to obtain a dispersion liquid of the particulate ester wax. Average particle size of the particulate ester wax measured by means of LA-500 was 340 nm.

(Dispersion Liquid-4 of Primary Polymer Particles)

28 parts of the wax dispersion liquid-3, 1.2 parts of a 15% aqueous solution of Neogen SC, and 393 parts of desalted water were charged in a reactor (volume: 60 liters; inside diameter: 400 mm) equipped with a stirring element (three-blade type), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 8% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| | |
|---|---|
| [Monomers] | |
| Styrene | 79 parts (5530 g) |
| Butyl acrylate | 21 parts |
| Acrylic acid | 3 parts |
| Bromotrichloromethane | 0.45 part |
| 2-mercaptoethanol | 0.01 part |
| Hexanediol diacrylate | 0.8 part |
| [Aqueous solution of an emulsifier] | |
| 15% Neogen SC aqueous solution | 1 part |
| Desalted water | 25 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight (Mw) of 122,000, a molecular weight peak (Mp) of 56,000, and an average particle size measured by UPA of 195 nm, and a Tg between 55 to 60° C. though obscure due to overlapping with the melting point of the wax. The amount of residual styrene monomer was 1,845 ppm.

(Dispersion Liquid-4 of a Particulate Resin)

5 parts of a 15% Neogen SC aqueous solution and 372 parts of desalted water were charged in a reactor (volume: 60 liters; inside diameter: 400 mm) equipped with a stirring element (3-blade type), a heating and cooling device, a concentrating device, and a device for charging respective starting materials and aids, the temperature of the mixture was raised to 90° C. under a nitrogen stream, then 1.6 parts of a 8% aqueous solution of hydrogen peroxide and 1.6 parts of a 8% aqueous solution of ascorbic acid were added thereto.

Thereafter, the following mixture of monomers and an aqueous solution of an emulsifier was added thereto in 5 hours from initiation of the polymerization, and an aqueous solution of the initiator was added thereto in 6 hours from initiation of the polymerization, followed by keeping the state for further 30 minutes.

| | |
|---|---|
| [Monomers] | |
| Styrene | 88 parts (6160 g) |
| Butyl acrylate | 12 parts |
| Acrylic acid | 2 parts |
| Bromotrichloromethane | 0.5 part |
| 2-mercaptoethanol | 0.01 part |
| Hexanediol diacrylate | 0.4 part |
| [Aqueous solution of an emulsifier] | |
| 15% Neogen SC aqueous solution | 2.5 parts |
| Desalted water | 24 parts |
| [Aqueous solution of an initiator] | |
| 8% aqueous solution of hydrogen peroxide | 9 parts |
| 8% aqueous solution of ascorbic acid | 9 parts |

After completion of the polymerization reaction, the reaction mixture was cooled to obtain a milky white polymer dispersion liquid. THF solubles of the resultant polymer had a weight average molecular weight (Mw) of 87,000, a molecular weight peak (Mp) at 58,000, and an average particle size measured by UPA of 123 nm, and a Tg of 85° C. The amount of residual styrene monomer was 2200 ppm.

Production-7 of a Toner for Development:

| | |
|---|---|
| Dispersion liquid-4 of the primary polymer particles | 95 parts (197 g: as solid content) |
| Dispersion liquid-4 of the particulate resin | 5 parts (as solid content) |
| Dispersion liquid-1 of the particulate colorant | 4.6 parts (as solid content) |
| 15% Neogen SC aqueous solution | 1.5 part (as solid content) |
| 5% Sodium persulfate aqueous solution | 0.44 part (as solid content) |

A toner was produced in the following procedures using the respective components described above.

The dispersion liquid of primary polymer particles and the 15% Neogen SC aqueous solution were charged in a reactor (volume: 2 liter; baffled double helical blades) and, after uniformly mixing the mixture, the dispersion liquid of particulate colorant was added thereto, followed by uniformly mixing it. To the thus obtained mixed dispersion liquid was dropwise added an aqueous solution of aluminum sulfate (0.4 part as solid content) under stirring. Then, the temperature of the mixture was raised to 55° C. in 25 minutes under stirring, and was kept at the temperature for 60 minutes, followed by raising the temperature to 63° C. in 30 minutes and keeping the temperature at the level for 20 minutes. Then, the dispersion liquid of particulate resin and the aqueous solution of aluminum sulfate (0.04 part as solid content) were added thereto in this order and, after keeping in this state for 30 minutes, the 15% Neogen SC aqueous solution (3.5 parts as solid content), 170 parts of desalted water and the 5% sodium persulfate aqueous solution (0.44 part as solid content) were added thereto, followed by raising the temperature to 92° C. in 100 minutes and keeping the temperature at the level for 3 hours. Thereafter, the mixture was cooled, filtered, washed with water, and dried to obtain a toner. The amount of residual styrene monomer in this toner was 102 ppm (in terms of solid content) before being dried. This toner was air dried at 40° C. for 48 hours to obtain a toner (toner-7) containing 30 ppm of residual styrene.

0.6 part of silica having been surface treated to impart hydrophilicity (R974; made by Aerosil Co.) was mixed with 100 parts of the toner to obtain a toner for development (developing toner-7).

Evaluation-7 of the Toner:

The developing toner-7 had a volume average particle size of 7.5 μm measured by Coulter Counter, contained particles of 5 μm or less in volume particle size in a ratio of 2.5% and particles of 15 μm or more in volume particle size in a ratio of 0.8, a ratio in number of particles having a particle size of 0.6 to 2.12 μm of 0.39%, a Dv/Dn value of 1.13, and a 50% circular degree of 0.95. Tetrahydrofuran insolubles of this toner-7 was 70% by weight in content and had a storage modulus G' of 400 Pa, and a loss modulus G" of 620 Pa.

EXAMPLE 7

A toner (toner-8) was produced in the same manner as described above except for not using sodium persulfate. The amount of residual styrene monomer in this toner-8 was 350 ppm.

In the Examples, both improvement of circular degree and reduction in the amount of monomer in the resultant toner particles can be attained in the process for producing the toner.

According to the process of the invention, deformation of agglomerate particles upon aging is easily be attained, and a good circular degree can be attained in a short time with generating a less amount of coarse particles upon aging.

In addition, the toner for developing electrostatic image produced according to the process of the invention has a small particle size and a sharp particle size distribution, thus being suited for obtaining a high quality image.

While the invention has been described in detail and with reference to specific embodiments thereof, it will be apparent to one skilled in the art that various changes and modifications can be made therein without departing from the spirit and scope thereof.

This application is based on Japanese Patent Application No. 2001-33053 filed on Feb. 9, 2001, the entire contents thereof being hereby incorporated by reference.

What is claimed is:

1. A process for producing a toner for developing electrostatic image comprising an agglomerate step wherein a dispersion liquid containing at least primary polymer particles and colorant particles is stirred in a stirring tank to agglomerate the particles to thereby obtain agglomerate of the particles and an aging step wherein the resultant agglomerate of the particles is kept at a temperature higher than the glass transition temperature of the primary polymer particles by 10° C. or more for a predetermined period of time to thereby fuse the particles, wherein the concentration of solid content C1 in the agglomerate step is 10 to 40% by weight, and the concentration of the solid content C2 in the aging step is in the range of $0.3C1 \leqq C2 \leqq 0.8C1$, wherein the primary polymer particles are those obtained by emulsion polymerization, and wherein the primary polymer particles obtained by emulsion polymerization contains 1000 to 3000 ppm, based on the polymer component therein, of residual monomers, and a pyrolytic free radical initiator is added to the dispersion liquid containing agglomerate of the particles in the aging step.

2. The process for producing a toner for developing electrostatic image as claimed in claim 1, wherein the dispersion liquid containing the agglomerate of the particles to be subjected to the aging step contains 1000 to 3000 ppm, based on the polymer component therein, of residual monomers.

3. A process for producing a toner for developing electrostatic image comprising an agglomerate step wherein a dispersion liquid containing at least primary polymer particles and colorant particles is stirred in a stirring tank to agglomerate the particles to thereby obtain agglomerate of the particles and an aging step wherein the resultant agglomerate of the particles is kept at a temperature higher than the glass transition temperature of the primary polymer particles by 10° C. or more for a predetermined period of time to thereby fuse the particles, wherein the concentration of solid content C1 in the agglomerate step is 10 to 40% by weight, and the concentration of the solid content C2 in the aging step is in the range of $0.3C1 \leqq C2 \leqq 0.8C1$, wherein a particulate resin is added to the dispersion liquid containing the agglomerate of the particles before or during the aging step to thereby adhere or fix the particulate resin to the agglomerate of the particles.

4. The process for producing a toner for developing electrostatic image as claimed in claim 3, wherein water is mixed upon or after completion of the agglomerate step.

5. The process for producing a toner for developing electrostatic image as claimed in claim 4, wherein water is mixed before the temperature of the dispersion liquid reaches Tg+10° C.

6. The process for producing a toner for developing electrostatic image as claimed in claim 3, wherein the agglomerate step and the aging step are conducted in the same stirring tank.

7. The process for producing a toner for developing electrostatic image as claimed in claim 3, wherein water is mixed together with an agglomerate terminator upon completion of the agglomerate step.

8. The process for producing a toner for developing electrostatic image as claimed in claim 3, wherein the primary polymer particles are those obtained by emulsion polymerization.

9. The process for producing a toner for developing electrostatic image as claimed in claim 8, wherein the primary polymer particles are those obtained by emulsion polymerization using a particulate wax as a seed.

10. A process for producing a toner for developing electrostatic image comprising an agglomerate step wherein a dispersion liquid containing at least primary polymer particles and colorant particles is stirred in a stirring tank to agglomerate the particles to thereby obtain agglomerate of the particles and an aging step wherein the resultant agglomerate of the particles is kept at a temperature higher than the glass transition temperature of the primary polymer particles by 10° C. or more for a predetermined period of time to thereby fuse the particles, wherein the concentration of solid content C1 in the agglomerate step is 10 to 40% by weight, and the concentration of the solid content C2 in the aging step is in the range of $0.3C1 \leqq C2 \leqq 0.8C1$, wherein the primary polymer particles are those obtained by emulsion polymerization using a particulate wax as a seed, and wherein the toner contains residual monomers in an amount of 100 ppm or less.

11. The process for producing a toner for developing electrostatic image as claimed in claim 10, wherein water is mixed upon or after completion of the agglomerate step.

12. The process for producing a toner for developing electrostatic image as claimed in claim 11, wherein water is mixed before the temperature of the dispersion liquid reaches Tg+10° C.

13. The process for producing a toner for developing electrostatic image as claimed in claim 10, wherein the agglomerate step and the aging step are conducted in the same stirring tank.

14. The process for producing a toner for developing electrostatic image as claimed in claim 10, wherein water is mixed together with an agglomerate terminator upon completion of the agglomerate step.

15. A process for producing a toner for developing electrostatic image comprising an agglomerate step wherein a dispersion liquid containing at least primary polymer particles and colorant particles is stirred in a stirring tank to agglomerate the particles to thereby obtain agglomerate of the particles and an aging step wherein the resultant agglomerate of the particles is kept at a temperature higher than the glass transition temperature of the primary polymer particles by 10° C. or more for a predetermined period of time to thereby fuse the particles, wherein the concentration of solid content C1 in the agglomerate step is 10 to 40% by weight, and the concentration of the solid content C2 in the aging step is in the range of $0.3C1 \leqq C2 \leqq 0.8C1$, wherein the toner has a storage modulus G' and a loss modulus G" at 200° C. of 400 Pa or more with respect to dynamic viscoelasticity.

16. The process for producing a toner for developing electrostatic image as claimed in claim 15, wherein water is mixed upon or after completion of the agglomerate step.

17. The process for producing a toner for developing electrostatic image as claimed in claim 16, wherein water is mixed before the temperature of the dispersion liquid reaches Tg+10° C.

18. The process for producing a toner for developing electrostatic image as claimed in claim 15, wherein the agglomerate step and the aging step are conducted in the same stirring tank.

19. The process for producing a toner for developing electrostatic image as claimed in claim 15, wherein water is mixed together with an agglomerate terminator upon completion of the agglomerate step.

20. The process for producing a toner for developing electrostatic image as claimed in claim 15, wherein the primary polymer particles are those obtained by emulsion polymerization.

21. The process for producing a toner for developing electrostatic image as claimed in claim 20, wherein the primary polymer particles are those obtained by emulsion polymerization using a particulate wax as a seed.

* * * * *